Patented Sept. 21, 1954

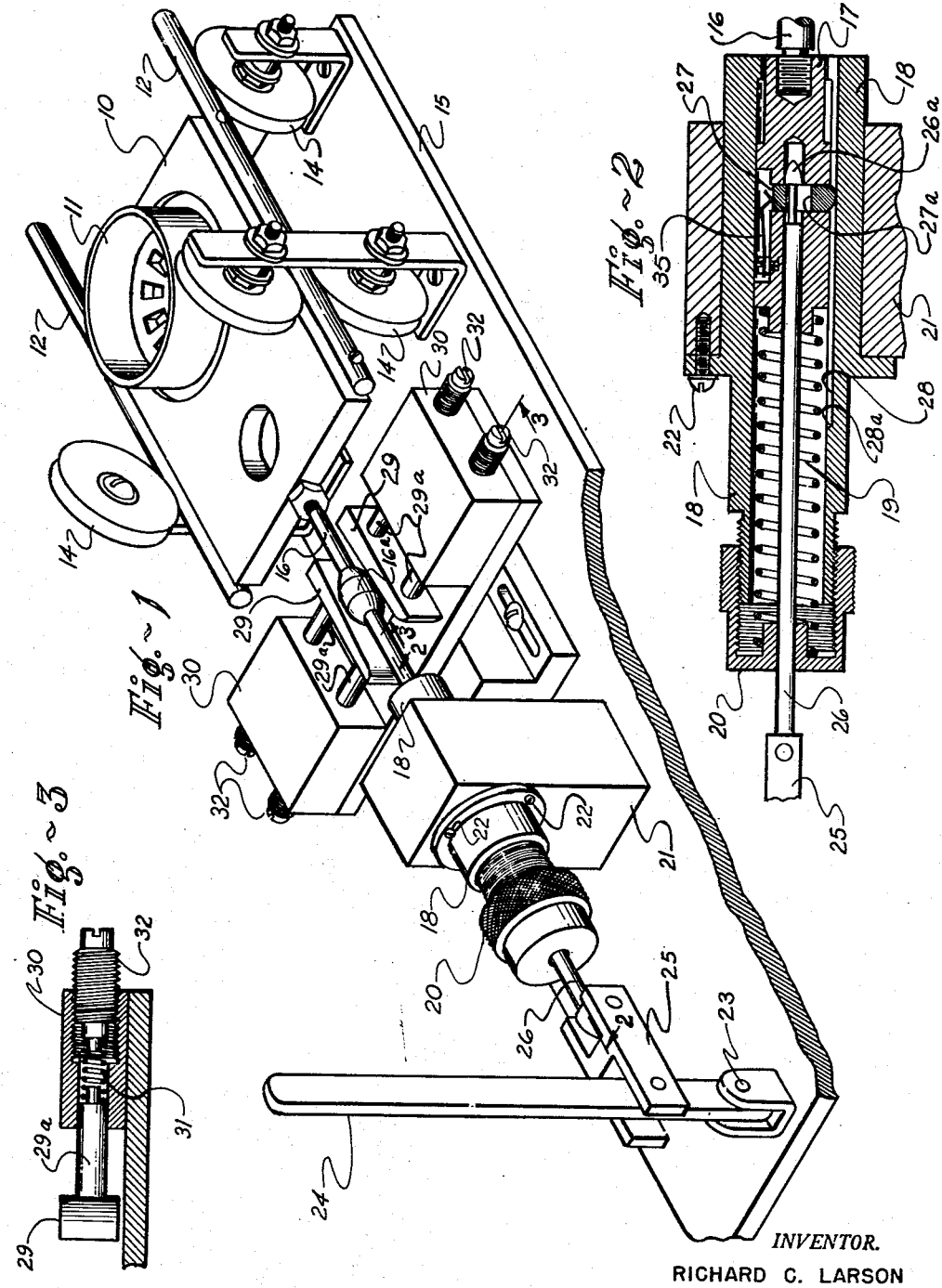

2,689,938

UNITED STATES PATENT OFFICE 2,689,938

SHOCK TESTING APPARATUS

Richard C. Larson, Sea Girt, N. J., assignor to the United States of America as represented by the Secretary of the Army Application September 5, 1950, Serial No. 183,217

19 Claims. (Cl. 324—20)

(Granted under Title 35, U. S. Code (1952), sec. 266)

The invention described herein may be manufactured and used by or for the Government for governmental purposes, without the payment of any royalty thereon.

This invention relates to improvements in apparatus for simulating shock to radio tubes.

Various forms of apparatus have been proposed for shock-testing vacuum tubes. Some examples of these are shown in Patent No. 2,476,297, issued July 19, 1949, to Edward R. Harris; and in Patent No. 2,496,298, issued February 7, 1950, to George Mackas. While these various shock-testers have served a useful purpose, they have one or more disadvantages such as there being no provision for imparting a shock or bump along the axis of a tube; there being metal-to-metal contact which does not give reliably representative shocks or bumps, does not allow for variation of the duration of impact, and gives rise to high frequency-high amplitude shocks which cannot be accurately controlled or measured; there being no way of knowing whether the first shock or the following vibration of the mount causes the damage to the tube; and there being no provision or operating action to reproduce or to simulate the longer-duration shocks such as radio or other electronic equipment is subjected to when in transit at high speed over rough terrain, for example.

With the foregoing in mind, it is one of the objects of the invention to provide improved apparatus of the character referred to which has none of the above disadvantages of those proposed heretofore; which is relatively simple in construction and manner of operation; which can be operated efficiently by untrained or unskilled personnel; which can be calibrated easily with existing accelerometers; which can be adjusted for both the duration and the extensiveness or severity of the shock or bump to be simulated; which has an operating range from a fraction of a gravitational unit to many thousands of gravitational units; and which is portable, inexpensive to manufacture, and sufficiently sturdy to insure a long life of continuous use.

Other objects and advantages will hereinafter appear.

For the purpose of illustrating this invention, an embodiment thereof is shown in the drawing, wherein Fig. 1 is an isometric view, partly broken away, of apparatus constructed and having operating characteristics in accordance with the invention; and Figs. 2 and 3 are enlarged, detail, sectional views, the sections being taken on the lines 2—2 and 3—3, respectively, in Fig. 1.

In Fig. 1, the reference numeral 10 designates a plate to which is secured a tube socket 11. To the opposite, longitudinal edges of plate 10 are fixed sections 12 of a rod, and these are received or engaged by a suitable number of rollers 14 supported as shown from the base 15 of the improved tube-testing apparatus. A tube to be shock-tested is inserted into socket 11, for straight-line, reciprocatory movement with the supporting plate or carriage 10.

To one end of plate 10 is fixed a rod 16 which is screwed into a piston 17 slidable freely within a housing 18 for a coil spring 19. A cap 20 is threaded onto the protruding end of housing 18, and by turning the former in one direction or the other, spring 19 may be compressed more or less between the cap and piston 17.

A block or pedestal 21 fixed to base 15 in any suitable manner, supports the spring-housing 18 which is secured to the block by screws 22.

Pivotally supported at 23 to the base 15, is a lever 24 connected by suitable linkage 25 to a rod 26 which extends through the adjustment cap 20 and has a relatively loose fit with respect to the latter.

The piston 17 serves as a releasable coupling or connection between rods 16 and 26. To this end, there is employed a pin 27 disposed and slidable in a hole drilled centrally through piston 17, and a tensioned spring 35 which is secured to piston 17 and disposed as shown, to press down upon the upper end of pin 27.

Drilled through the center and at right angles to the longitudinal axis of pin 27, is a hole 27a, and for a short distance at the righthand end of rod 26 the diameter thereof is reduced as shown, to a diameter substantially less than that of this rod. This construction provides a tip or head 26a which engages pin 27 to lock piston 17 to rod 26 for movement with the latter, to the left. The hole 27a is slightly larger in diameter than rod 26, and with pin 27 in the position thereof shown in Fig. 2, the disposition of hole 27a is such that the center thereof is slightly below the longitudinal axis of rod 26.

In the operation of the improved apparatus, the tube to be shock-tested is inserted into socket 11, and lever 24 is pulled back to compress spring 19 between piston 17 and cap 20. The tip or head 26a being engaged or interlocked with pin 27 to couple rod 16 to rod 26, carriage 10 and the tube supported thereby are moved to an extreme position to the left. When this position is reached, the lower, rounded end of pin 27 will have come to the cam surface 28a at the end of a longitudinal slot 28 in the inside surface of the housing 18. Engaging the cam surface 28a, pin 27 is forced up against the opposing force exerted by spring 35 until the hole 27a is substantially concentric to or lined up with rod 26. At the instant this occurs, the mechanical or trigger-like connection between rods 16 and 26 is broken to release the compressed spring 19. The first half of the resulting movement of carriage 10, if plotted to give an acceleration vs. time curve, will take substantially the form of the 0° to 90° portion of a half-sine wave. At the point of travel of carriage 10 whereat the greater part of the force previously stored in spring 19 has been expended, movement of the carriage is retarded by the buffer or cushioning means shown in Figs. 1 and 3. In the disclosed embodiment of the invention, this means is shown disposed between carriage 10 and the spring 19, and consists of complementary, wedge-shaped shoes 29 each provided with supporting elements 29a which have a sliding fit in blocks 30 fixed to base 15. Coil springs 31, disposed between elements 29a and studs 32 screwed into blocks 30, provide for an adjustable cushioning or buffer action. In operation of the apparatus, a cam-shaped lug or enlargement 16a fixed on or integral with shaft 16, engages the adjacent faces of shoes 29 at approximately the point on the acceleration vs. time curve whereat the differential becomes zero, and the deceleration is to start. Moving between the shoes 29 at a relatively fast rate, the lug 16a engages shoes 29 and spreads them apart against the resultant forces of those due to surface-friction and those caused by the compressed springs 31. Variation or adjustment of this retarding or deceleration action can be accomplished by design of the cam faces of shoes 29 as well as adjustment of studs 32 to compress more or less the springs 31.

After release of carriage 10, and after the same comes to rest, the lever 24 is moved forward to the position shown in Fig. 1, whereupon the tip or head 26a or rod 26 is forced through the opening 27a in pin 27, and the latter snaps down in front of the head 26a, under the force exerted by spring 28.

The shape of the acceleration vs. time curve may be made to suit particular requirements by adjusting cap 20 to fix the degree of maximum compression of spring 19, by adjusting studs 32 to control the retarding action of shoes 29, by adjusting the position of shoes 29 longitudinally with respect to base 15 to determine the instant at which lug 16a engages the adjacent cam surfaces of shoes 29, by selecting for spring 19 a type or kind which has the correct characteristics to produce the results desired, or by employing any combination of two or more of these expedients.

While but one embodiment of the invention has been disclosed it will be understood that various modifications, such as in the size, shape and arrangement of the parts may be made without departing from the spirit of the invention or the scope of the claims.

The invention claimed is:

1. In apparatus for simulating shock, means supported for reciprocatory movement, spring means, means for placing said spring means under stress to render the latter effective as a mechanical force of a predetermined amount, means including said spring means and associated with said first-named means for imparting movement to the latter incident to release of said force, a pair of wedge-shaped shoes supported against said movement and in opposed spaced relation, and spring means holding said shoes yieldingly against further separation from each other, one of the moveable parts of said apparatus being provided with a cam-shaped lug moveable between and engageable with the respective adjacent faces of said shoes incident to said movement of said first-named means, said lug being arranged to be out of engagement with said shoes prior to release of said force and to engage said shoes only subsequent to the expenditure of substantially the greater part of said force.

2. In apparatus for simulating shock to radio tubes, a carriage for supporting a tube socket, means supporting said carriage for reciprocatory movement, a coil spring, means for stressing said spring to render the latter effective as a mechanical force of a predetermined amount, means including said spring and associated with said carriage for imparting movement to the latter incident to release of said force, a pair of wedge-shaped shoes disposed between said carriage and said spring and supported against said movement and in opposed spaced relation, and spring means holding said shoes yieldingly against further separation from each other, one of the moveable parts of said apparatus being provided with a cam-shaped lug moveable between and engageable with the respective adjacent faces of said shoes incident to said movement of said carriage, said lug being arranged to be out of engagement with said shoes prior to release of said force and to engage said shoes only subsequent to the expenditure of substantially the greater part of said force.

3. In a shock testing apparatus, a carriage on which to secure an object to be subjected to mechanical shock, a part connected to said carriage, means supporting said carriage for reciprocatory movement, springs means, means for stressing said spring means to provide a mechanical force, means including said spring means mechanically coupled to said carriage for imparting movement to the latter incident to the release of said force, and shock absorbing means to smoothly dampen and then stop the movement of said carriage comprising at least one member having a surface disposed at an acute angle with respect to the direction of movement of said part and positioned so as to be struck by said part on said surface during the movement of said part.

4. Apparatus as set forth in claim 3, further including means coupled to said member to allow the movement thereof in a direction perpendicular to the direction of movement of said part.

5. Apparatus as set forth in claim 4, further including means coupled to said member to provide a cushioning effect to the movement of said member in a direction perpendicular to the direction of movement of said part.

6. Apparatus as set forth in claim 5 in which said means to provide a cushioning effect comprise a plurality of coil springs.

7. Apparatus as set forth in claim 5, further including adjustable means for adjusting the magnitude of said cushioning effect.

8. Apparatus as set forth in claim 7, further including second adjustable means for adjusting the position of said member longitudinally of said direction of movement of said part.

9. A mechanical shock test apparatus comprising a first member on which to mount an object to be subjected to mechanical shock, a part connected to said first member, means for imparting to said first member and said part an adjustable accelerating force to effect the movement thereof, and shock absorbing means to smoothly dampen and then stop the movement of said member and said part comprising a second member positioned to be struck by said part, and means coupled to said second member to provide a cushioning effect to the movement thereof.

10. A mechanical shock test apparatus comprising a first member on which to mount the object to be subjected to mechanical shock, a part connected to said first member, means for imparting to said first member and said part an adjustable accelerating force to effect the movement thereof, and shock absorbing means to smoothly dampen and then stop the movement of said member and said part comprising a second member having a surface disposed at an acute angle with respect to the direction of movement of said part and positioned to be struck by said part on said surface.

11. A mechanical shock test apparatus comprising a first member on which to mount an object to be subjected to mechanical shock, a part connected to said first member, means for imparting to said first member and said part an adjustable accelerating force to effect the movement thereof, and shock absorbing means to smoothly dampen and then stop the movement of said member and said part comprising a second member having a surface disposed at an acute angle with respect to the direction of movement of said part and positioned to be struck by said part on said surface, and means coupled to said second member to provide a cushioning effect to the movement thereof.

12. In a mechanical shock test apparatus, a member on which to secure an object to be subjected to mechanical shock, and means for imparting to said member an accelerating force comprising a hollow cylinder, a piston having a first aperture therein axially of said piston and a second aperture therethrough perpendicular to and intersecting said first aperture, said first aperture extending beyond the point of intersection of said first and second apertures, said piston being disposed within said cylinder and being mechanically coupled to said first member, first spring means associated with said piston for applying force thereto when stressed, a pin disposed within said second aperture, said pin having an aperture therethrough radially thereof and a rounded end, said cylinder having a longitudinal depressed portion along the inner surface thereof extending from one end of said cylinder toward the other end thereof, said depressed portion being terminated by a sloping surface joining the bottom of the depressed portion with the inner surface of said cylinder, the rounded end of said pin being disposed in said depressed portion, second spring means applying force to the other end of said pin to maintain the rounded end thereof in said depressed portion, a shaft, a given end of said shaft passing through the first aperture in said piston and the aperture in said pin, said shaft having an abruptly constricted portion of smaller diameter than that of said given end of said shaft where said shaft passes through said pin, and means for moving said shaft axially of said cylinder away from said one end thereof.

13. In a mechanical shock test apparatus, a member on which to secure an object to be subjected to mechanical shock, and means for imparting to said member an accelerating force comprising a hollow cylinder closed at one end, said closed end having an aperture therethrough, a piston having a first aperture therein axially of said piston and a second aperture therethrough perpendicular to and intersecting said first aperture, said first aperture extending beyond the point of intersection of said first and second apertures, said piston being disposed within said cylinder and being mechanically coupled to said first member, a coil spring between the closed end of said cylinder and said piston, a pin disposed within said second aperture, said pin having an aperture therethrough radially thereof and a rounded end, said cylinder having a longitudinal depressed portion along the inner surface thereof extending from the open end of said cylinder toward the closed end thereof, said depressed portion being terminated by a sloping surface joining the bottom of the depressed portion with the inner surface of said cylinder, the rounded end of said pin being disposed in said depressed portion, spring means applying force to the other end of said pin to maintain the rounded end thereof in said depressed portion, a shaft, one end of said shaft passing through the aperture in the end of said cylinder, said first aperture in said piston and the aperture in said pin, said shaft having an abruptly constricted portion of smaller diameter than that of said one end where said shaft passes through said pin, and means for moving said shaft axially of said cylinder toward the closed end thereof.

14. In a mechanical shock test apparatus, a carriage on which to secure an object to be subjected to mechanical shock, and means for imparting to said carriage an accelerating force comprising a first member with a longitudinal channel therein, a second member disposed in and slidable along said channel, said second member having a first aperture therethrough axially of said channel and a second aperture therethrough perpendicular to and intersecting said first aperture, said first aperture extending beyond the point of intersection of said first and second apertures, said second member being mechanically coupled to said carriage, spring means associated with said second member for applying force thereto when stressed, a pin disposed within said second aperture, said pin having an aperture therethrough radially thereof and a rounded end, said first member having a longitudinal groove along the inner surface of said channel, said depressed portion being terminated by a sloping surface joining the bottom of the depressed portion with said inner surface of said channel, the rounded end of said pin being disposed in said depressed portion, spring means applying force to the other end of said pin to maintain the rounded end thereof in said depressed portion, a shaft, a given end of said shaft passing through said first aperture in said second member and the aperture in said pin, said shaft having an abruptly constricted portion of smaller diameter than that of said given end of said shaft where said shaft passes through said pin, and means for moving said shaft axially of said depressed portion toward the sloping surface thereof.

15. In a mechanical shock test apparatus comprising a carriage on which to mount an object to be subjected to mechanical shock, and means for imparting to said carriage an adjustable accelerating force to effect the movement thereof, a release comprising a first member having a longitudinal channel and a longitudinal depression on the inner surface of said channel, said depression being terminated by a sloping surface joining the bottom of the depression with the inner surface of said channel, a second member disposed in and slidable along said channel, said second member having a first aperture therein and a second aperture therethrough perpendicular to and intersecting said first aperture, said first aperture extending beyond the point of intersection of said first and second apertures, the center axis of said first aperture being substantially parallel to said depression, a pin disposed within said second aperture, said pin having an aperture therethrough radially thereof and a rounded end, said rounded end of said pin being disposed in said depression, means applying force to the other end of said pin to maintain the rounded end thereof in said depression, a rod having an abruptly constricted portion between the ends thereof, passing through the first aperture in said piston and the aperture in said pin, said constricted portion being aligned with said pin, and means for moving said piston axially of said cylinder in the directon of the sloping surface of said depression.

16. Apparatus as set forth in claim 3, further including adjustable means coupled to said spring means for adjusting the magnitude of the force released to impart movement to said carriage.

17. In a mechanical shock producing test apparatus comprising a first member on which to mount an object to be subjected to mechanical shock, and means for imparting to said first member an adjustable accelerating force to effect the movement thereof, a release for said last-named means comprising a hollow cylinder with a longitudinal depressed portion on the inner surface thereof, said portion being terminated by a surface joining the bottom of the groove with the inner surface of said cylinder, a piston disposed within said cylinder, said piston having an axial first aperture therein and a second aperture therethrough perpendicular to and intersecting said first aperture, said first aperture extending beyond the point of intersection of said first and second apertures, a pin disposed within said second aperture, said pin having an aperture therethrough radially thereof and a rounded end, said rounded end of said pin being disposed in said depressed portion, a rod having an abruptly constricted portion between the ends thereof passing through the first aperture in said piston and the aperture in said pin, said constricted portion being aligned with said pin, and means for moving said piston axially of said cylinder in the direction of said surface terminating said depressed portion.

18. In a shock-tester, a member supported for reciprocatory movement, spring means, means for placing said spring means under stress to render the latter effective as a mechanical force of a predetermined amount, said second-named means including a coupling and a release means for said coupling, means including said spring means associated with said member for imparting movement to the latter in response to the actuation of said release means, and means for actuating said release means so as to release said coupling when said spring means is placed under a stress sufficient to be effective as a mechanical force of said predetermined amount.

19. A shock tester comprising a carriage on which to mount an object to be subject to shock, means supporting said carriage for reciprocatory movement, a coil spring, means for stressing said spring to render the latter effective as a mechanical force of a predetermined amount, said second-named means including a coupling having a pin movable to release the coupling, means including said spring and associated with said carriage for imparting movement to the latter incident to release of said coupling, and means for imparting movement to said pin to release said coupling and disposed to be effective for such purpose only when said spring means is placed under stress sufficient for the same to be effective as a mechanical force of said predetermined amount.

References Cited in the file of this patent

UNITED STATES PATENTS

| Number | Name | Date |
| --- | --- | --- |
| 1,465,927 | Baumann | Aug. 28, 1923 |
| 1,708,262 | Davis | Apr. 9, 1929 |
| 2,476,297 | Harris | July 19, 1949 |
| 2,496,298 | Mackas | Feb. 7, 1950 |
| 2,537,096 | Shreeve et al. | Jan. 9, 1951 |
| 2,610,504 | Nigh | Sept. 16, 1952 |

FOREIGN PATENTS

| Number | Country | Date |
| --- | --- | --- |
| 450,678 | France | Jan. 25, 1913 |
| 727,342 | France | Mar. 22, 1932 |